United States Patent
Kim et al.

(10) Patent No.: US 6,999,256 B2
(45) Date of Patent: Feb. 14, 2006

(54) METHODS OF MEASURING TPTP OF MAGNETIC HEAD AND CONTROLLING RECORDING CURRENT

(75) Inventors: Jong-Yoon Kim, Yongin-si (KR); Chang-Dong Yeo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 233 days.

(21) Appl. No.: 10/733,253

(22) Filed: Dec. 12, 2003

(65) Prior Publication Data

US 2004/0125478 A1    Jul. 1, 2004

(30) Foreign Application Priority Data

Dec. 13, 2002  (KR) ............... 10-2002-0079751

(51) Int. Cl.
*G11B 27/36*    (2006.01)
(52) U.S. Cl. ............. 360/31; 360/46; 360/53; 360/68; 360/25
(58) Field of Classification Search ............ None
See application file for complete search history.

(56) References Cited

U.S. PATENT DOCUMENTS

| | | | | |
|---|---|---|---|---|
| 4,967,289 A | * | 10/1990 | Kanota et al. ............ | 386/104 |
| 5,600,500 A | * | 2/1997 | Madsen et al. ............ | 360/46 |
| 5,687,036 A | * | 11/1997 | Kassab ............ | 360/53 |
| 6,717,759 B1 | * | 4/2004 | Himle et al. ............ | 360/31 |
| 6,867,940 B1 | * | 3/2005 | Pleiss ............ | 360/59 |
| 6,876,509 B1 | * | 4/2005 | Bonin et al. ............ | 360/75 |
| 2001/0013985 A1 | | 8/2001 | Baba et al. | |
| 2004/0100255 A1 | * | 5/2004 | Brunnett et al. ............ | 324/210 |

OTHER PUBLICATIONS

Patent Abstract of Japan, Publication No. 2001229637, Published Aug. 24, 2001, Abstract Only.

* cited by examiner

*Primary Examiner*—David Hudspeth
*Assistant Examiner*—Dan I Davidson
(74) *Attorney, Agent, or Firm*—Staas & Halsey LLP

(57) ABSTRACT

A method of measuring the degree of thermal pole tip protrusion (TPTP) of a magnetic head and controlling a recording current in consideration of the degree of TPTP, in relation to a hard disk drive includes measuring the rate of errors contained in data by performing writing and reading operations while changing the level of an overshoot current (OSC), detecting a minimum error rate and a maximum error rate while changing a range of the OSC, and determining the degree of TPTP by measuring the difference between the minimum error rate and the error rate at the maximum OSC.

28 Claims, 9 Drawing Sheets

FIG. 4A
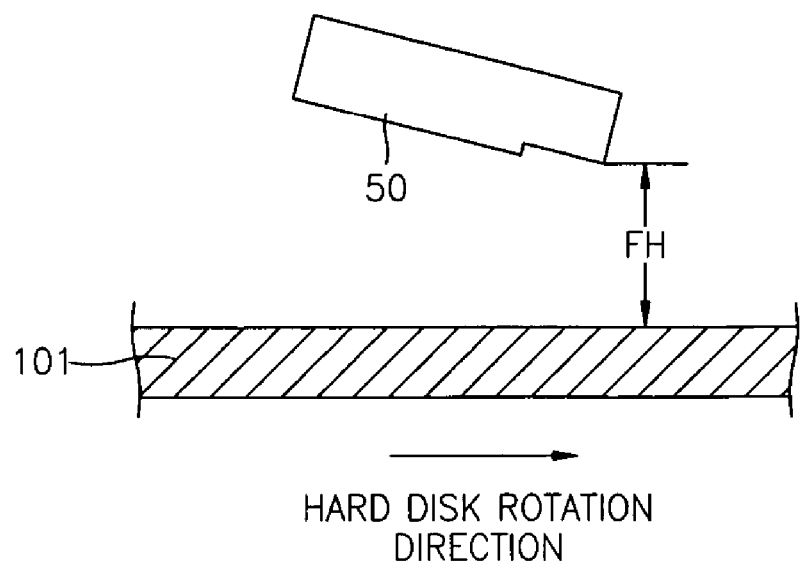
HARD DISK ROTATION DIRECTION
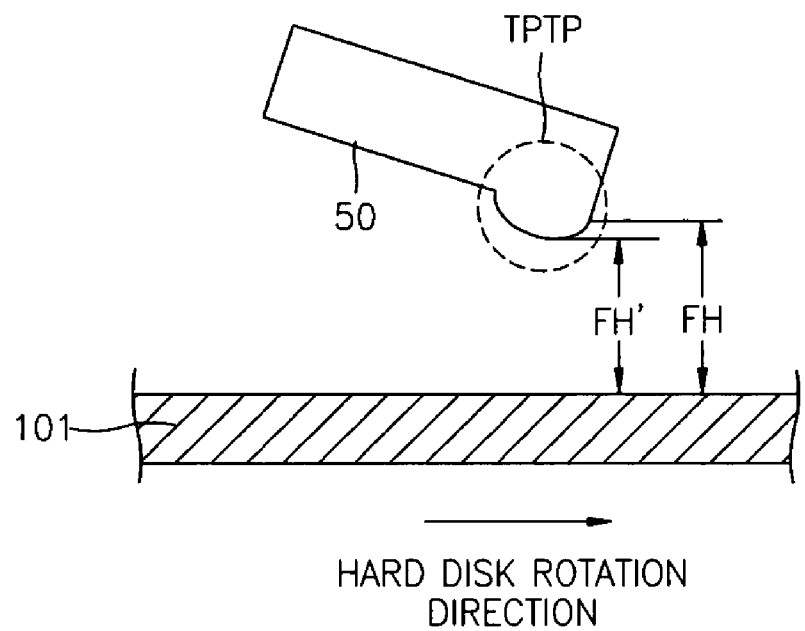
HARD DISK ROTATION DIRECTION
FIG. 4B

METHODS OF MEASURING TPTP OF MAGNETIC HEAD AND CONTROLLING RECORDING CURRENT

CROSS-REFERENCE TO RELATED APPLICATION

This application claims the priority of Korean Patent Application No. 2002-79751 filed Dec. 13, 2002, in the Korean Intellectual Property Office, the disclosure of which is incorporated herein in its entirety by reference.

BACKGROUND OF THE INVENTION

1. Field of the Invention

The present invention relates to a hard disk drive, and more particularly, to a method of measuring the thermal pole tip protrusion (TPTP) of a magnetic head and controlling a recording current based on the degree of TPTP.

2. Description of the Related Art

A hard disk drive is one type of auxiliary storage device used in a computer, which reads/records data from/to a magnetic layer on a hard disk, using a magnetic head. In general, in a hard disk drive, a recording magnetic head is formed of metal, such as Permalloy containing 80% of Ni and 20% of Fe, and a slider, which supports the head, is formed of a non-metallic material.

During a write operation, a Joule of heat is generated when a recording current flows through a metal recording coil and causes a difference between coefficients of thermal expansion of the recording magnetic head, which is a metal material, and the slider which is a non-metallic material. The difference in thermal expansion causes the circumference of a pole of the head to protrude. Such a phenomenon is called thermal pole tip protrusion (TPTP).

TPTP reduces the margin of a head/disk interface (hereinafter referred to as "HDI"), resulting in a decrease in the flying height of the head. If TPTP is excessive, the HDI deteriorates. In a worst-case scenario, excessive TPTP causes a collision of the disk with the head, damage to the head pole, and thermal asperity (TA).

The degree of TPTP is proportional to $i^2 R$. Here, i denotes a recording current flowing through a recording coil, and R denotes the resistance of the recording coil. To reduce the degree of TPTP, the recording current i and resistance R need to be reduced. In detail, the resistance R is a factor determined by the properties of the recording coil and the value of the resistance R is fixed during manufacture of the head. The recording current i is determined by a write current (WC) or an overshoot current (OSC) used by the hard disk drive. Because, the degree of TPTP is proportional to the square value of the recording current i, that is, TPTP is affected more greatly by the recording current i than the resistance R.

Since hard disk drives have been designed to be highly integrated, the flying heights of heads have become lower. Thus, problems caused by TPTP cannot be ignored. In this connection, Japanese Laid-Open Patent Publication No. 2001-229637, published on Aug. 24, 2001, discloses a method of determining whether the flying height of a head falls within a desired level, based on a gain of a servo signal.

The problems caused by TPTP are well known but a method of precisely measuring the degree of TPTP has yet to be designed. Therefore, controlling hard disk drives by applying the same TPTP value to their heads is unavoidable. However, because every head has its own TPTP degree, it is not effective in all cases to apply the same TPTP value to different heads, and thus, it is difficult to effectively control hard disk drives.

However, the degree of TPTP of a head is not considered or is considered standard during conventional hard disk optimization. Thus, it is difficult to effectively optimize a write channel of a hard disk drive.

SUMMARY OF THE INVENTION

The present invention provides a method of measuring the thermal pole tip protrusion (TPTP) of a head.

The present invention also provides a method of controlling a recording current using such a method.

According to an aspect of the present invention, there is provided a method of measuring thermal pole tip protrusion (TPTP) of a magnetic head included in a hard disk drive, the method includes measuring the rate of errors contained in data by performing writing and reading operations while changing the level of an overshoot current (OSC), detecting a minimum error rate within changing a range of the OSC, and an error rate at a maximum OSC, and determining the degree of TPTP by measuring the difference between the minimum error rate and the error rate at the maximum OSC.

Additional aspects and/or advantages of the invention will be set forth in part in the description which follows and, in part, will be obvious from the description, or may be learned by practice of the invention.

According to another aspect of the present invention, measuring the error rate of data is performed on a test zone of a disk where the relationship between the OSC and the error rate of data is clearly disclosed.

According to another aspect of the present invention, there is provided a method of controlling a recording current to optimize a hard disk drive including measuring the error rate of data by performing writing and reading operations while changing the level of OSC, detecting a minimum error rate based on a rate of errors measured while changing a range of the OSC and an error rate at a maximum OSC, determining the degree of TPTP of a magnetic head by measuring the difference between the minimum error rate and the error rate at the maximum OSC, and determining degrees of adjusting a write current and the OSC versus temperature, based on the determined degree of TPTP.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4A shows the state of a magnetic head during a read operation;

FIG. 4B shows the state of the magnetic head during a write operation;

DETAILED DESCRIPTION OF THE EMBODIMENTS

Figure 1:
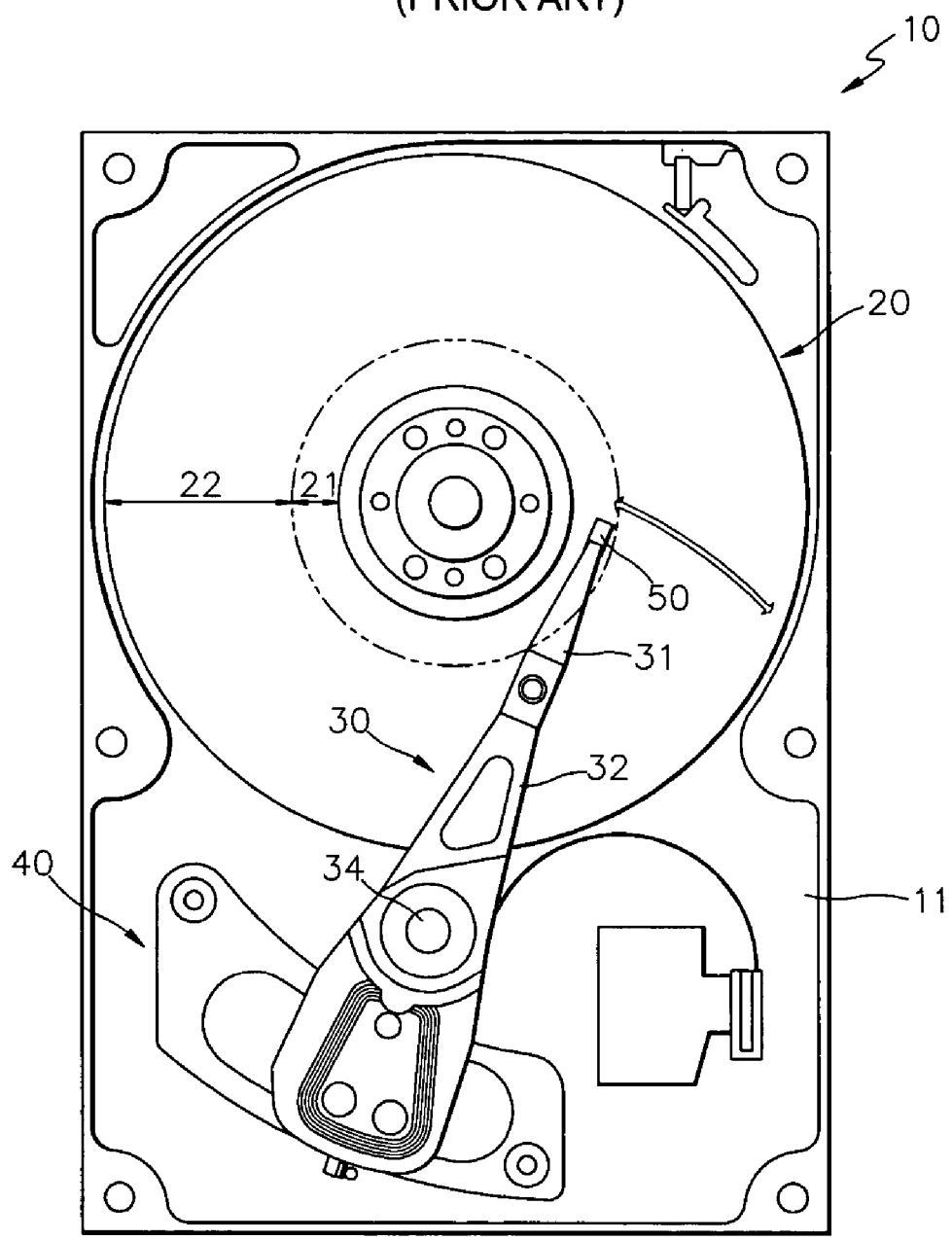
FIG. 1 is a schematic plan view illustrating the structure of a general hard disk drive system.

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention concerns a method of measuring thermal pole tip protrusion (TPTP) characteristics of a head during manufacture of a hard disk drive by, for example, a burn-in test process. Also, the present invention provides a method of reducing the levels of a write current and an overshoot current (OSC) in a head having more severe TPTP than other heads.

In general, a hard disk drive system includes at least one magnetic head that records/reads data on a portion of a rotating hard disk. The magnetic head magnetizes or detects a magnetic area of a hard disk surface to read information from, or writes information to the magnetized area.

FIG. 1 is a schematic plan view of a general hard disk drive system 10. Referring to FIG. 1, the hard disk drive system 10 includes a hard disk 20 on which information is recorded is placed on a base 11 for rotation, and a magnetic head transfer device 40 that moves a magnetic head (not shown) to a desired track of the hard disk 20 so as to write information to or read information from the hard disk 20. Here, the hard disk 20 includes a recording area 22 on which information is recorded and a parking area 21 on which the magnetic head is parked when rotation of the hard disk 20 stops.

A magnetic head (not shown) is mounted on the magnetic head transfer device 40, and the magnetic head transfer device 40 includes a magnetic head assembly 30 that is installed to revolve with respect to a rotating axis 34 installed on the base 11, and a magnetic head transfer device 40 that rotates the magnetic head assembly 30 using an electromagnetic force.

The magnetic head assembly 30 includes a suspension 31 that is coupled to an end of an actuator arm 32 to be rotated with respect to the rotating axis 34, the magnetic head that writes information to or reads information from the hard disk 20, and a magnetic head slider 50 mounted on the suspension 31.

The magnetic head slider 50 is biased toward the hard disk 20 by the suspension 31 and flies over the hard disk 20, without making contact with the hard disk 20, by dynamic air pressure caused the rotation of the hard disk 20. The flying height of the magnetic head slider 50 is determined by the gram load of the suspension 31 and the lift force due to airflow from the rotation of the hard disk 20.

Here, the flying height can be understood as a gap between a read sensor, i.e., a magneto-resistive (MR) head, and a surface of the hard disk 20, the gap being formed on the front of the magnetic head slider 50, when the magnetic head slider 50 flies so as not to contact the hard disk 20 during rotation of the hard disk 20. The gram load is a force generated by the suspension 31.

Figure 2:
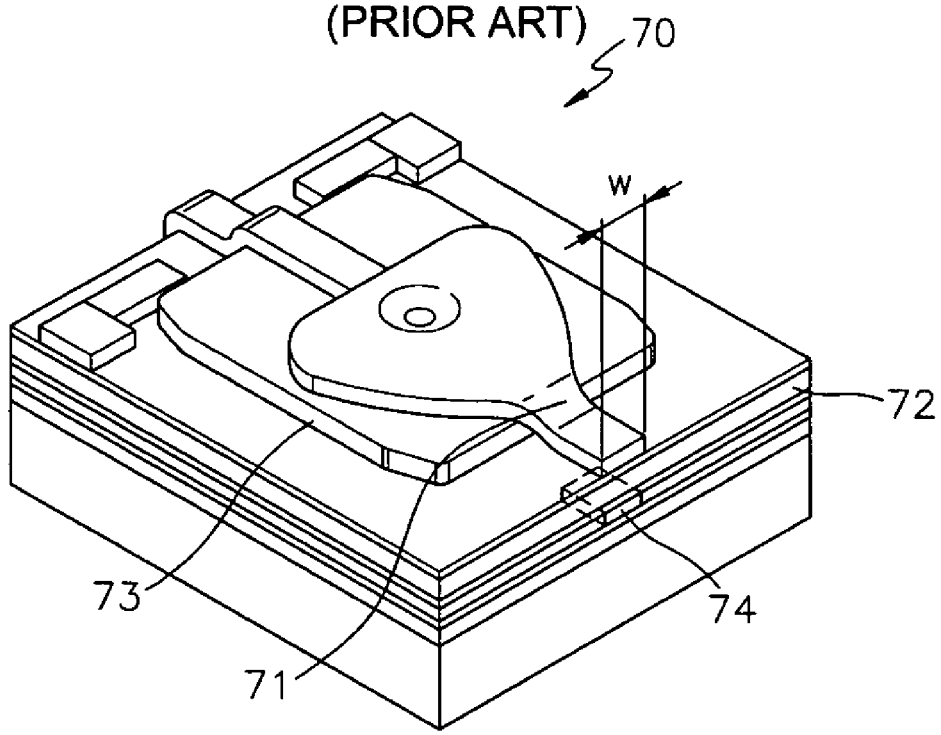
FIG. 2 is a magnified view of a general magnetic head.

FIG. 2 is a magnified view of a general magnetic head 70. Referring to FIG. 2, the magnetic head 70 includes an MR head 74 for reading and an induction recording head for writing. The MR head 74 perceives and reads a magnetic signal recorded on the hard disk 20. The induction recording head includes a top pole 71 and a bottom pole 72 that form a leakage magnet on the hard disk 20, and a recording coil 73 that generates a magnetic field when an electric current is supplied to the recording coil 73 and enables recording of a desired magnetic signal on the hard disk 20.

Meanwhile, there is a growing need to increase tracks per inch (TPI) and reduce a track width W so as to increase the capacity of the hard disk 20. A reduction in the track width W of the hard disk 20 requires a reduction of a width of a recording head that records a magnetic signal on the hard disk 20. Also, the flying height of the magnetic head 70 is required to be lower to read a magnetic field recorded on a track of a small size.

However, a reduction in the flying height of the magnetic head 70 results in a reduction in the gap between the magnetic head slider 50 and the hard disk 20, and the magnetic head slider 50 may contact the hard disk 20 during the flying of the magnetic head 70 for movement of the magnetic head slider 50 to a track or the parking area 21 of FIG. 1 of the hard disk 20. Therefore, the magnetic head 70 or the hard disk 20 may be damaged.

Figure 3:
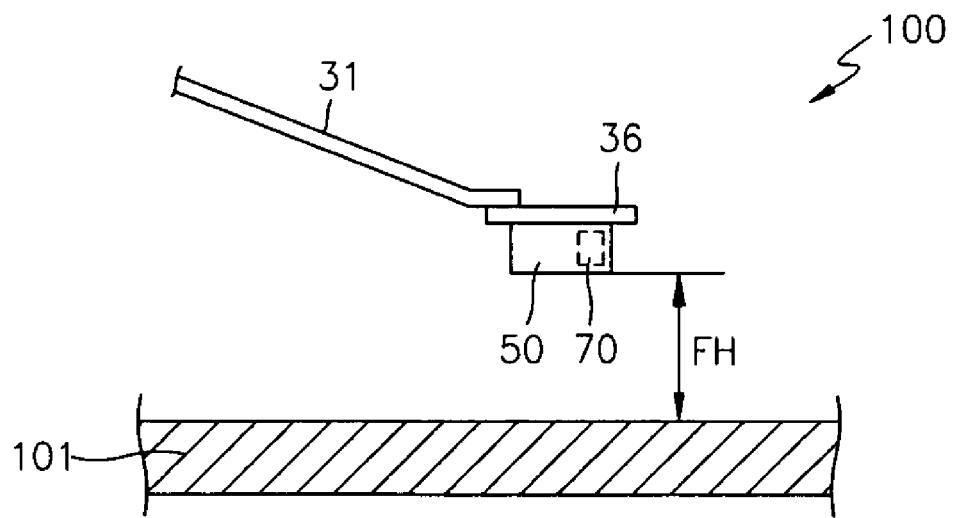
FIG. 3 is a schematic, perspective view of a conventional magnetic head assembly.

FIG. 3 is a schematic, perspective view of a conventional magnetic head assembly 100 disclosed in Korean patent application No. 97-36559 filed on Jul. 31, 1997 by the present applicant. Referring to FIG. 3, the magnetic head assembly 100 includes a suspension 31 that is coupled to an end of an actuator arm (not shown) to make a magnetic head slider 50 biased toward a magnetic disk 101, the magnetic head slider 50 coupled to the suspension 31, and a gimbal 36 installed between the magnetic head slider 50 and the suspension 31 to support the magnetic head slider 50.

The suspension 31 is designed to affect the flying height of the magnetic head slider 50 using a lift force due to airflow from the rotation of the magnetic disk 101, which is a recording medium, and stably maintains the flying of the magnetic head slider 50.

The magnetic head 70 is positioned on a front surface of the magnetic head slider 50 facing the magnetic disk 101.

During a write operation, when TPTP of the magnetic head 70 exceeds a predetermined level, recording of the magnetic head 70 is likely to fail or a partial recording failure or scratches of the magnetic head 70 can occur.

FIGS. 4A and 4B illustrate the problems caused by TPTP of a head. FIG. 4A shows the state of the head during a read operation, and FIG. 4B shows the state of the head during a write operation. A recording pole of the head shown in FIG. 4B protrudes more than that of the head shown in FIG. 4A. The protrusion of the recording pole is caused by the difference between the coefficients of thermal expansion of the magnetic head 70 formed of metal and the magnetic head slider 50 formed of a non-metallic material. The protrusion of the recording pole reduces the flying height and makes the magnetic head 70 collide with a disk 101 in a worst-case scenario, thereby causing damage to a head pole and thermal asperity (TA).

The degree of TPTP is proportional to $I^2R$. Here, I denotes a recording current and R denotes a resistance of a recording coil. Thus, I and R must be reduced to alleviate TPTP.

Figure 5:
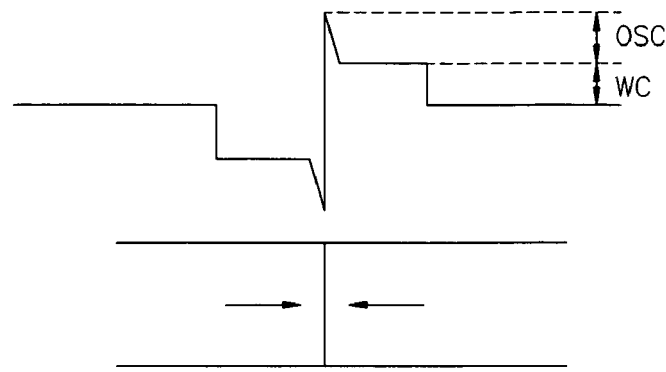
FIG. 5 is a waveform diagram of a recording current.

FIG. 5 is a waveform diagram of a recording current. As shown in FIG. 5, the recording current has a sharp rising edge at a turning point of data to be recorded on a disk. Here, a rising substance of the recording current is called an overshoot current (OSC).

A DC substance, (i.e., a write current (WC)), of the recording current maintains the intensity of a magnetic field to be almost equivalent to the coercivity of a hard disk and the OSC acts as a trigger for raising the intensity of the magnetic field to be the same as or stronger than the coercivity at the turning point of the data.

In conclusion, TPTP of the head is most greatly affected by the OSC during a write operation.

Figure 6:
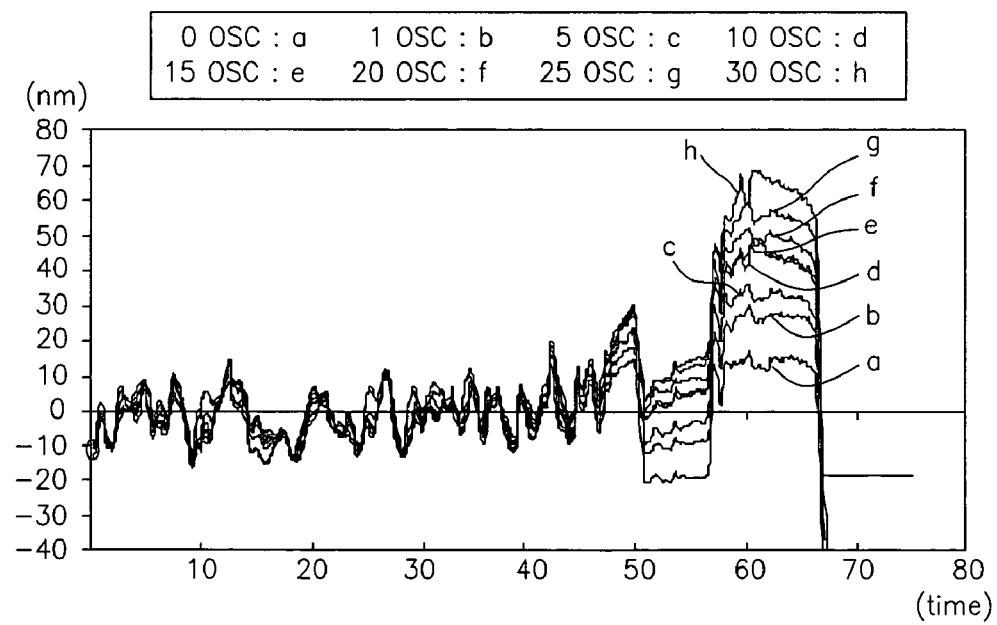
FIG. 6 is a graph illustrating a variation in TPTP of a head versus a change in an overshoot control value.

FIG. 6 is a graph illustrating a variation in TPTP of a head versus a change in an overshoot control value. The graph indicates the degrees of TPTP in units of nm when the values of overshoot control, which adjusts the level of an OSC, are 0(a), 1(b), 5(c), 10(d), 15(e), 20(f), 25(g), and 30(h), respectively.

When the profile of TPTP is measured while changing an overshoot control value of a recording current, the larger the overshoot control value, the greater the degree of TPTP. That is, the higher the overshoot control value of the recording current, the smaller a gap between the head and a disk. An experiment revealed that TPTP was formed to a thickness of 10 Å when the overshoot control value changes by four steps. That is, the flying height is reduced by about 10% when the overshoot control value changes by four steps, considering that in general the flying height of the head is about 100 Å. This reduction means that the performance of a hard disk drive can be greatly affected by TPTP.

Figure 7:
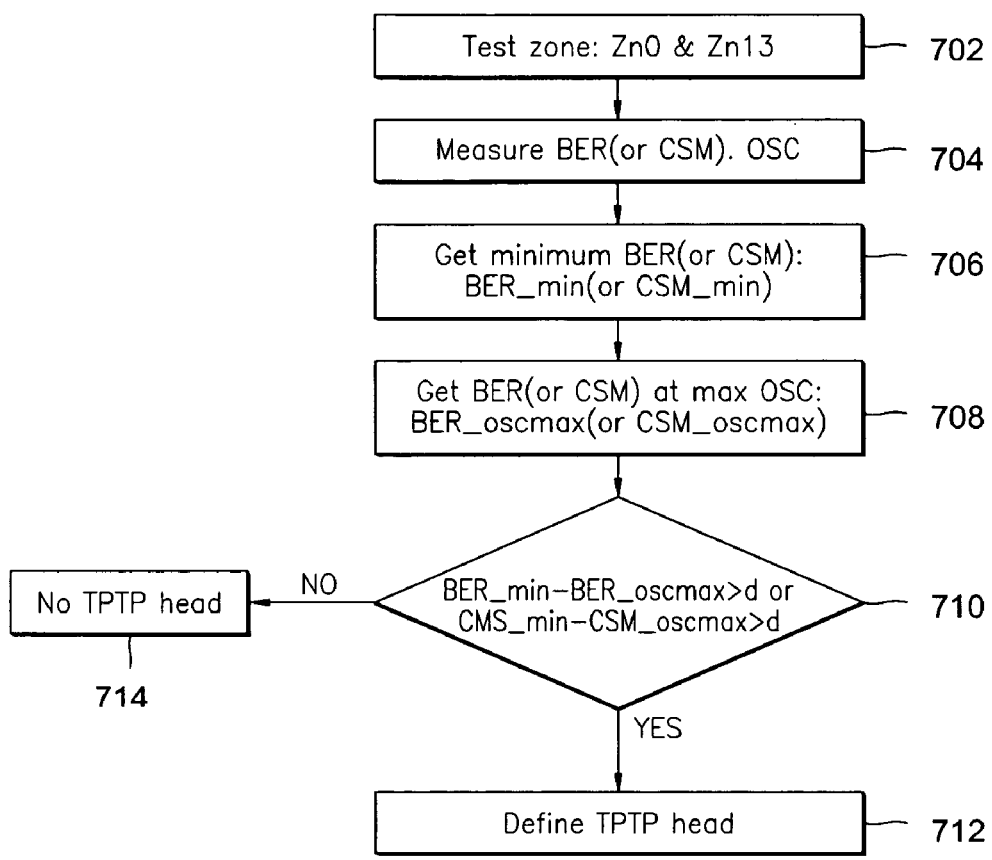
FIG. 7 is a flowchart illustrating a method of measuring TPTP according to an embodiment of the present invention.

FIG. 7 is a flowchart illustrating a method of measuring TPTP of a head according to an embodiment of the present invention. In this embodiment of the present invention, the degree of TPTP is measured by computing error rates during a write operation and a read operation while changing the level of an OSC. Here, the error rates are indicated with bit error rates (BERs) or channel statistic measurements (CSMs).

The measurement of TPTP according to the present invention is performed during a burn-in test process included in a disk manufacturing process. However, it is understood that the measurement may be performed at other times.

Referring to FIG. 7, first, a test zone is selected from a disk in action 702. The test zone is determined by a middle diameter (MD) and outer diameter (OD) of the disk. TPTP of a head is also affected by a recording frequency and becomes greater as the recording frequency becomes higher. The recording frequency of the OD is higher than that of an inner diameter (ID) of the disk and thus is frequently used in measuring TPTP.

In this embodiment, TPTP is measured at a lower atmospheric pressure than ambient atmospheric pressure where the flying height is low at a low density of air and problems caused by TPTP can be precisely measured. The low atmospheric pressure may be created using an altitude chamber.

In action 704, BERs or CSMs are measured while changing the level of an OSC. The OSC can be adjusted to a predetermined level. In other words, the BERs or the CSMs are measured while increasing the level of the OSC starting from the lowest level or reducing the level of the OSC starting from the highest level.

Within the range of given OSCs, data is repeatedly and continuously recorded on a track selected in the test zone a predetermined number of times, the recorded data is read from the track a predetermined number of times, and the BER or the CSM in the data is measured.

In action 706, a minimum BER BER_min (or a minimum CSM CSM_min) is obtained from the profile of TPTP measured in action 704. In action 708, a BER BER_oscmax (or a maximum CSM CSM_oscmax) at a maximum OSC is measured. The difference between the minimum BER BER_min and the BER BER_oscmax indicates the degree of TPTP.

In action 710, it is checked whether the difference between the minimum BER BER_min and the BER BER_oscmax is larger than a predetermined threshold d. The degree of TPTP is determined to be high when the difference is larger than the predetermined threshold d in action 712, and otherwise determined to be low in action 714.

Figure 8:
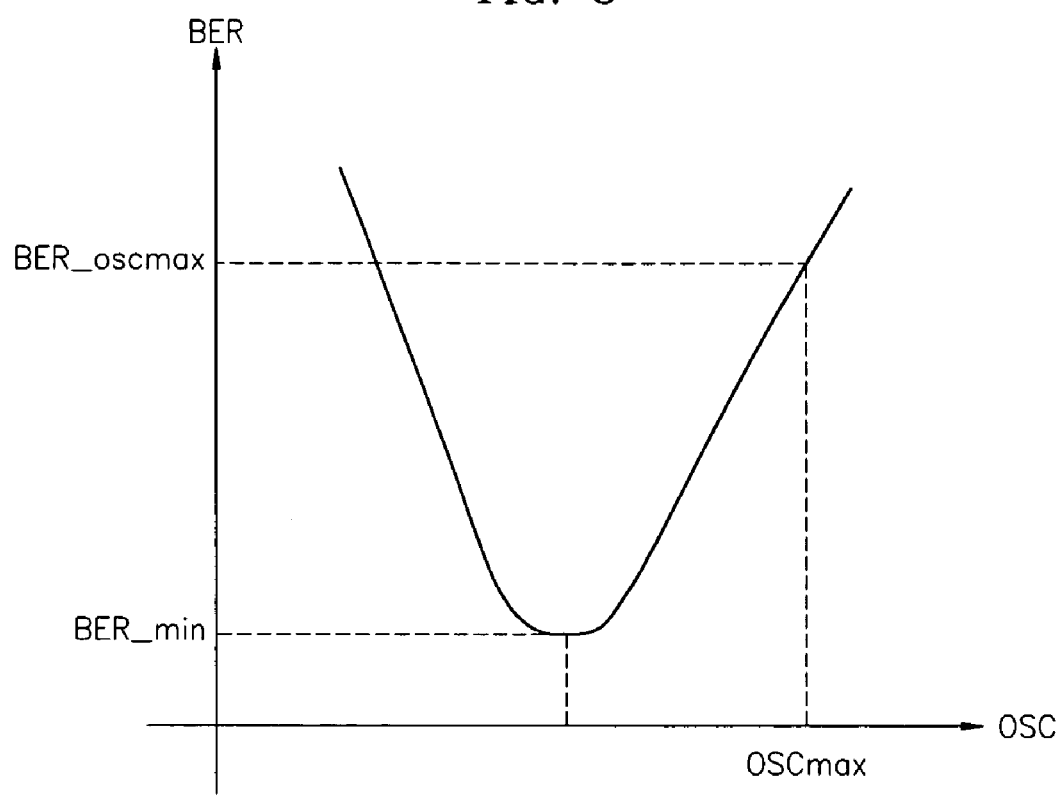
FIG. 8 is a graph illustrating a relationship between an overshoot current (OSC) and a bit error rate (BER) measured using actions 704 through 708 of FIG. 7.

FIG. 8 is a graph illustrating a relationship between an OSC and a BER measured using actions 704 through 708 of FIG. 7. Referring to FIG. 8, a BER versus the OSC depicts a V-shaped curve with a minimum BER BER_min as a bight. In this relationship, the magnitude of a magnetic field becomes smaller and the BER becomes larger when the level of OSC is low, whereas the degree of TPTP becomes greater and the BER becomes larger when the level of OSC is high.

Accordingly, if the difference between a minimum BER BER_min and a BER BER_oscmax at a maximum OSC is the same as or larger than a predetermined threshold d, the degree of TPTP of a head can be determined to be excessive. Here, the threshold d is a factor that varies depending on the characteristics or quality criteria of a hard disk drive. Also, the threshold d may be set differently according to the location of a test zone. For instance, a recording frequency at the outer diameter (OD) of a disk is higher than that at the middle diameter (MD), and thus, the degree of TPTP occurring at the OD is higher than that of TPTP occurring at the MD. Thus, the threshold d at the OD is determined to be smaller than that at the MD.

In general, although the degree of TPTP caused at the OD is higher than at the MD or the inner diameter (ID), a zone of a disk appropriately showing the relationship between an OSC and a BER may be determined to be a test zone.

Figure 9:
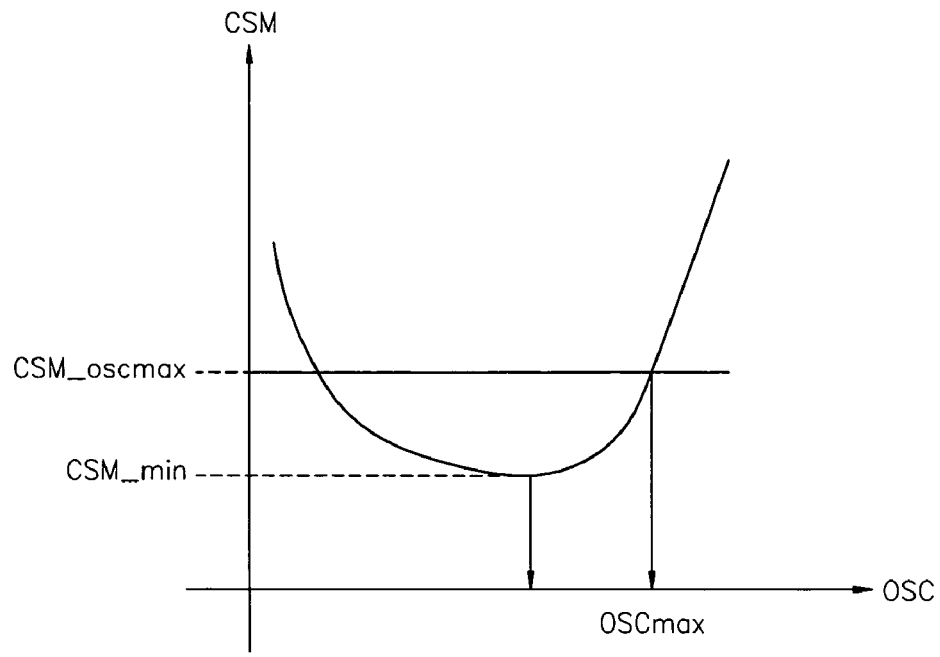
FIG. 9 is a graph illustrating another relationship between an OSC and a channel statistic measurement (CSM) measured using actions 704 through 708 of FIG. 7.

FIG. 9 is a graph illustrating a relationship between an OSC and a CSM measured using actions 704 through 708 of FIG. 7. As is apparent from FIG. 9, the relationship between OSC and a CSM shows a similar pattern to that between an OSC and a BER.

Here, the BER denotes the rate of bit errors within a predetermined number of data bits contained in a signal read using a head, and the CSM is a channel performance measurement obtained by measuring the rate of bit errors within a channel chip. TPTP of the head can be measured more quickly by CSMs than by BERs. Also, the BER and the CSM have a roughly logarithmic relationship.

Accordingly, when the difference between a minimum CSM CSM_min and a CSM CSM_oscmax at a maximum OSC is the same as or larger than a predetermined threshold d, the degree of TPTP of a head can be considered high.

Figure 10:
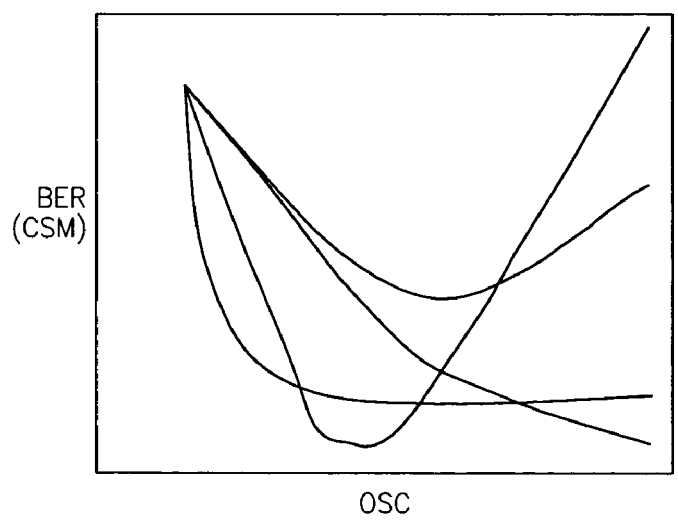
FIG. 10 is a graph illustrating TPTP of different heads.

The degree of TPTP depends on the characteristics of a head. For instance, the degree of TPTP changes according to the material of the head or the bonding degree of the head with a slider. As shown in FIG. 10, the degrees of TPTP of different heads are different from one another.

In the case of a head with a high degree of TPTP, as OSC increases, the increase in the OSC results in a rapid increase in a BER, and the difference between an optimal OSC and a maximum OSC is large, whereas in the case of a head with a low degree of TPTP, the OSC and the BER increase or decrease gradually and the difference between an optimal OSC and a maximum OSC is small.

Conventionally, a recording current is controlled by optimising a write current (WC) or an OSC in consideration of only the degree of adjacent track erasure (ATE) of a head. More specifically, within the range of a given WC or OSC, data is recorded repeatedly and continuously on a particular track several times and the recorded data is read from the track to check the occurrence of errors. If an error is detected, recording and reading are repeated while changing the amount of WC or OSC. The WC or the OSC used when any error is not detected in the recorded data are determined to be the optimum WC or OSC respectively.

Further, in a hard disk drive, a BER changes according to temperature. When the hard disk drive is used at a low temperature, the coercivity of a magnetic layer increases and thus the WC or the OSC is increased to reduce the coercivity, whereas when the hard disk drive is used at a high temperature, the coercivity of the magnetic layer decreases and thus the WC or OSC is reduced to increase the coercivity.

Figure 11:
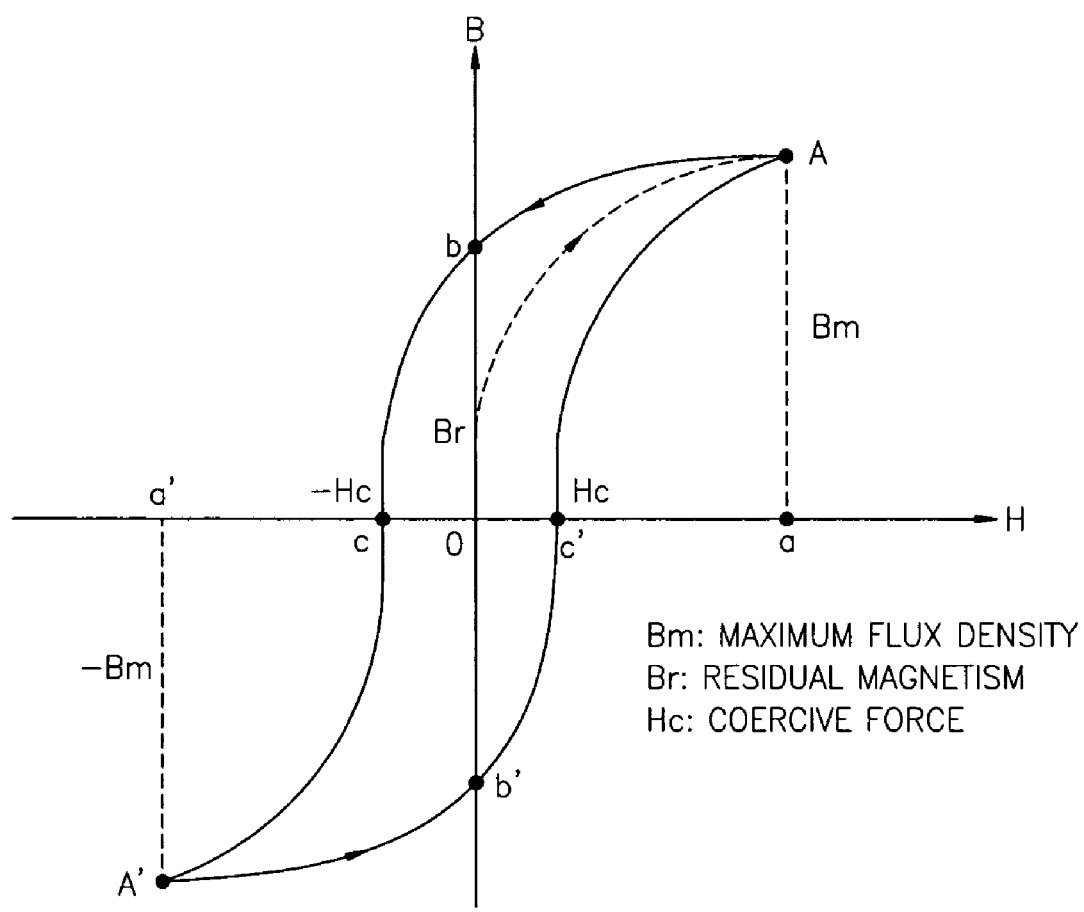
FIG. 11 illustrates a magnetic hysteresis curve of the hard disk.

FIG. 11 illustrates a magnetic hysteresis curve of a hard disk. Referring to FIG. 11, the magnitude of a magnetic field H is set from zero to 'a' so as to obtain a flux density Bm with a range from zero to A. In this case, even if a current is zero, residual magnetism Br having a range from zero to b remains. To remove the residual magnetism Br, if a new magnetic field H is made by forcing the current to flow in the opposite direction, the flux density B is zero when the magnitude of the magnetic field H is from zero to c. Next, if the magnitude of the magnetic field H is further increased in the opposite direction, a flux density −Bm, which is an inverse of the flux density Bm, is obtained when the magnitude of the magnetic field H is from zero to a'. Next, if a current is reduced to zero and magnetization is continued in the original direction, the magnetic hysteresis curve sequentially passes through points b' and c', and the magnitude of the magnetic field H is again from zero to a and the flux density Bm is again obtained. Such a phenomenon is called hysteresis or magnetic hysteresis.

Here, Hc denotes a coercivity that is a demagnetizing force required to reduce the flux density to zero after magnetizing a ferrormagnetic substance to saturization.

As mentioned above, the coercivity Hc becomes high when the operational temperature of a hard disk drive is low, and vice versa. The coercivity Hc of the hard disk drive depends on the material of the hard disk drive, but in general, it is roughly 3200 Oe (Oersted: the unit of magnetizing force) at −60° C., 3000 Oe at 0° C., and 2800 Oe 60° C.

Therefore, the WC and OSC are increased by a predetermined amount to reduce the coercivity of a hard disk drive in a low-temperature mode and reduced by a predetermined amount to increase the coercivity in a high-temperature mode. For instance, the WC is increased by 8 mA and the OSC are increased by six steps in a low-temperature mode, and the OSC is reduced by four steps in a high-temperature mode.

However, in a conventional method of controlling recording current, the WC and the OSC are indiscriminately increased or reduced to a predetermined level in both a high-temperature mode and a low-temperature mode, while not taking into consideration TPTP of each head. Thus, if the degree of TPTP of a head is higher, the WC or the OSC become excessively high or low and a HDI worsens. As a result, it is more likely to cause head damage, thermal asperity (TA), and a sharp decrease in an altitude margin that is caused by a change in the flying height according to a pressure change.

In this embodiment of the present invention, the level of a recording current is determined in consideration of the degree of TPTP of a head, thereby enabling optimum control of the recording current.

Figure 12:
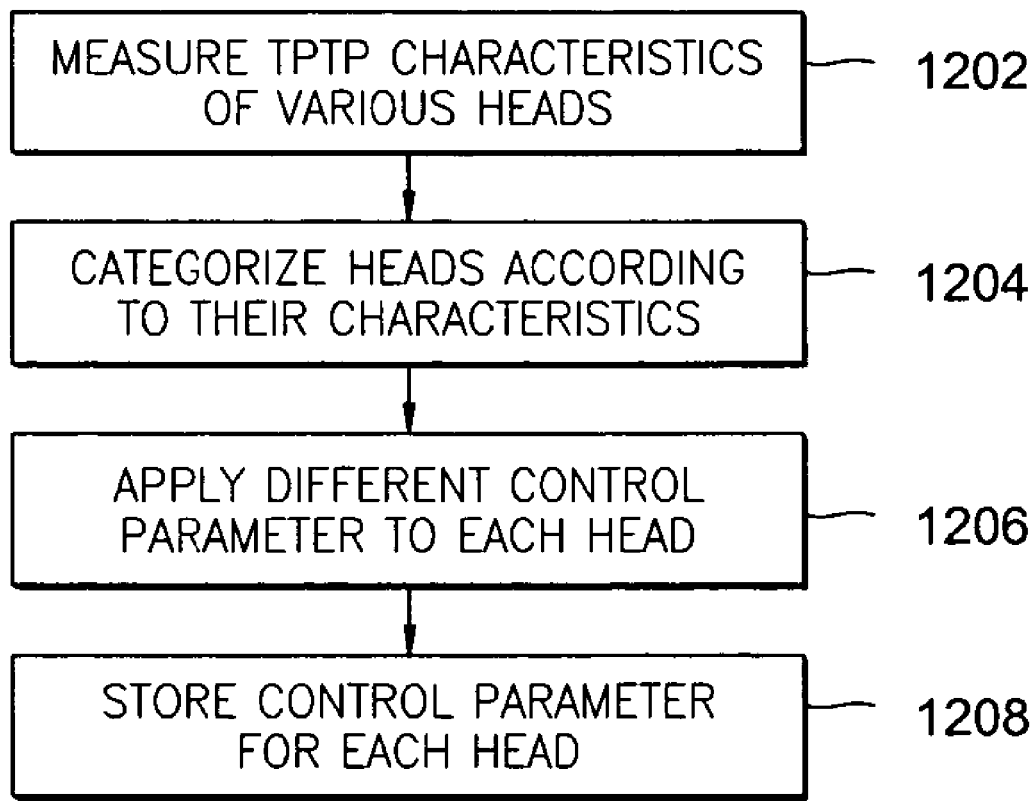
FIG. 12 is a flowchart illustrating a method of controlling a recording current according to an embodiment of the present invention.

FIG. 12 is a flowchart illustrating a method of controlling a recording current. Referring to FIG. 12, TPTP of several heads is measured as instructed in the method of FIG. 7, in action 1202.

In action 1204, these heads are categorized into two types of heads: heads with a low degree of TPTP, and heads with a high degree of TPTP, based on TPTP measured in action 1202.

In action 1206, recording current control parameters are set differently according to the type of head. For instance, at a low-temperature mode, the control parameters are determined such that the levels of WC and OSC are lower for heads with a high degree of TPTP than for heads with a low degree of TPTP. The control parameters may be changed depending on factors such as a HDI and quality criteria. If the degree of TPTP of a head is above a predetermined level, the levels of OSC and WC are appropriately adjusted in consideration of the degree of TPTP and the state of the HDI.

In action 1208, the determined recording current control parameters are recorded on a maintenance cylinder of a disk. Alternatively, these parameters may be stored in non-volatile memory.

Tables 1 and 2 show examples of parameters that vary according to temperature with respect to a head with a low degree of TPTP and a head with a high degree of TPTP respectively:

TABLE 1

| Temperature | All zone |
| --- | --- |
| 10.0° C.–15.0° C. | Use for each zone |
| 5.0° C.–10.0° C. | Use for each zone |
| <5.0° C. | Use OSC1 for each zone |

TABLE 2

| Temperature | All zone |
| --- | --- |
| 10.0° C.–15.0° C. | Use OSC2 for each zone |
| 5.0° C.–10.0° C. | Use for each zone |
| <5.0° C. | Use for each zone |

Here, OSC1 denotes an overshoot current set at a low-temperature mode and OSC2 denotes an overshoot current set at a high-temperature mode.

In a method of measuring the degree of TPTP according to the present invention, TPTP of different heads can be quantitatively measured during a burn-in test process.

In a method of controlling a recording current according to the present invention, recording current control parameters are differently set based on the characteristics of respective heads. Therefore, it is possible to prevent the occurrence of errors during writing, such as the adjacent track erasure (ATE) characteristics of a head or weak write, under user environmental conditions. Further, the performance of a hard disk drive can be improved.

Also, the method of controlling a recording current improves the life and reliability of a head affected by excessive high overshoot currents (OSCs) and write currents (WCs).

The method of FIGS. 7 and 12 can be implemented as a computer program encoded as a computer readable medium to be used by a controller of the type found in conventional hard disk drives as shown in FIG. 1. It is further understood that the hard disk drive as shown in FIG. 1 could be adapted to perform the method of FIGS. 7 and 12 according to an aspect of the present invention.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of measuring thermal pole tip protrusion (TPTP) of a magnetic head included in a hard disk drive, the method comprising:
   measuring a rate of errors contained in data by performing writing and reading operations while changing a level of an overshoot current (OSC);
   detecting a minimum error rate based on the rate of errors measured while changing the level of the OSC;
   measuring an error rate at a maximum OSC; and
   determining a degree of TPTP by measuring a difference between the minimum error rate and the error rate at the maximum OSC.

2. The method of claim 1, wherein the measuring the rate of errors contained in data is performed on a test zone of a disk where the relationship between the OSC and the rate of errors of data is clearly disclosed.

3. The method of claim 2, wherein the test zone is located at an outer diameter of the disk.

4. The method of claim 1, wherein the measuring the rate of errors contained in data is performed at a low pressure.

5. The method of claim 1, further comprising:
   comparing the difference between the minimum error rate and the error rate at the maximum OSC with a predetermined threshold; and
   determining that the degree of TPTP of the magnetic head is low when the difference between the minimum error rate and the error rate at the maximum OSC is less than the predetermined threshold.

6. The method of claim 5, wherein the threshold is determined based on a head/disk interface (HDI) and quality criteria.

7. The method of claim 5, wherein the threshold is determined based on the characteristics of a zone of the disk wherein the measuring the rate of errors contained in data is performed.

8. The method of claim 1, wherein the rate of errors contained in data is a bit error rate (BER).

9. The method of claim 1, wherein the rate of errors contained in data is a channel statistics measurement (CSM).

10. A method of controlling a recording current to optimize a hard disk drive, comprising:
    measuring an error rate of data by performing writing and reading operations while changing a level of OSC;
    detecting a minimum error rate based on the rate of errors measured while changing the level of the OSC;
    measuring an error rate at a maximum OSC;
    determining a degree of TPTP of a magnetic head by measuring a difference between the minimum error rate and the error rate at the maximum OSC; and
    determining degrees of adjusting a write current and the OSC versus temperature, based on the determined degree of TPTP.

11. The method of claim 10, wherein the determining degrees of adjusting the write current and the OSC comprises:
    comparing the difference between the minimum error rate and the error rate at the maximum OSC with a predetermined threshold;
    determining the degree of TPTP of the magnetic head is high when the difference between the minimum error rate and the error rate at the maximum OSC is higher than the predetermined threshold; and
    setting recording current control parameters such that the degree of an increase in OSC for a magnetic head with a high-degree of TPTP is lower than that of an increase in OSC for a magnetic head with a low-degree of TPTP.

12. The method of claim 10, wherein the measuring the error rate of data is performed in a test zone of a disk where the relationship between the OSC and the error rate is clearly disclosed.

13. The method of claim 12, wherein the test zone is located at an OD of the disk.

14. The method of claim 10, wherein the measuring the error rate of data is performed at a low pressure.

15. The method of claim 10, wherein the error rate of data is a BER.

16. The method of claim 11, wherein the error rate is a CSM.

17. A method of controlling a recording coil current based on a level of TPTP of a magnetic head in a hard disk drive system, comprising:
    determining a minimum data error rate based on OSC;
    measuring a maximum data error rate at a maximum OSC;
    determining a level of TPTP if a difference between the minimum data error rate and the maximum error rate is greater than or equal to a predetermined threshold;
    adjusting the recording coil current of the hard disk drive system during write operations based on the level of TPTP.

18. The method of claim 17, wherein the determining the minimum data error rate based on OSC comprises:
    selecting a test zone on a disk in the hard disk drive system;
    measuring a plurality of data error rates that result during a plurality of read/write operations to the disk as the OSC is incremented through a predetermined range; and
    selecting a minimum data error rate based on the measured data error rates.

19. The method of claim 18, wherein the level of TPTP is stored on a maintenance cylinder of the disk.

20. The method of claim 18, wherein the level of TPTP is stored in a read only memory.

21. The method of claim 18, wherein the level of TPTP is stored in a non-volatile memory.

22. The method of claim 17, wherein if the difference between the minimum data error rate and the maximum error rate is less than the predetermined threshold, the level of TPTP is not used in adjusting the recording coil current of the hard disk drive system during write operations.

23. The method of claim 17, wherein the determining the level of TPTP is performed during a burn in test of the hard disk drive system.

24. A computer readable medium encoded with processing instructions for implementing the method of claim 17 performed by a computer.

25. A hard disk drive system, comprising:
a data storage disk that stores data;
a reading/writing head having a recording coil which transfers the data with respect to the data storage disk;
an actuator that causes relative movement between the reading/writing head and the data storage disk;
at least one storage area storing a plurality of hard disk drive commands including a level of TPTP and current control parameters based on the level of TPTP for the recording coil; and
a controller that
controls a recording coil current during writing operations of the reading/writing head based upon the current control parameters recalled from the at least one storage area,
develops the current control parameters for the recording coil of the reading/writing head based on the level of TPTP, and
downloads the current control parameters to the at least one storage area to be recalled while controlling the recording coil current.

26. The hard disk drive system as in claim 25, wherein the controller develops the current control parameters for the reading/writing head based on the level of TPTP by,
determining a minimum data error rate based on a range of OSC of the recording coil;
measuring a maximum data error rate at a maximum OSC;
determining a level of TPTP if a difference between the minimum data error rate and the maximum error rate is greater than or equal to a predetermined threshold; and
determining current control parameters for the recording coil based on the level of TPTP.

27. The hard disk drive system as in claim 25, wherein the at least one storage area is a maintenance cylinder of the disk.

28. The hard disk drive system as in claim 25, wherein the at least one storage area is a non-volatile memory of the hard disk drive system.

\* \* \* \* \*